US008433250B2

(12) United States Patent
Bhattacharya et al.

(10) Patent No.: US 8,433,250 B2
(45) Date of Patent: Apr. 30, 2013

(54) ESTIMATING WHETHER A WIRELESS TERMINAL IS INDOORS USING PATTERN CLASSIFICATION

(75) Inventors: Tarun Kumar Bhattacharya, San Jose, CA (US); Hassan Mohamed El-Sallabi, Palo Alto, CA (US); Scot Douglas Gordon, Redmond, WA (US); Yasuhiro Oda, Kanagawa (JP); Jiyun Shen, Kanagawa (JP)

(73) Assignee: NTT DoCoMo, Inc. (JP)

( * ) Notice: Subject to any disclaimer, the term of this patent is extended or adjusted under 35 U.S.C. 154(b) by 576 days.

(21) Appl. No.: 12/696,951

(22) Filed: Jan. 29, 2010

(65) Prior Publication Data

US 2011/0189960 A1  Aug. 4, 2011

(51) Int. Cl.
*H04B 17/00* (2006.01)
(52) U.S. Cl.
USPC ........................................ 455/67.11; 455/63.1
(58) Field of Classification Search ............... 455/456.1, 455/67.11, 404.2, 456.6
See application file for complete search history.

(56) References Cited

U.S. PATENT DOCUMENTS

| | | | | |
|---|---|---|---|---|
| 2004/0219930 | A1* | 11/2004 | Lin | 455/456.1 |
| 2005/0124354 | A1* | 6/2005 | Durgin | 455/456.1 |
| 2005/0208952 | A1* | 9/2005 | Dietrich et al. | 455/456.1 |

FOREIGN PATENT DOCUMENTS

| | | |
|---|---|---|
| JP | 10-051840 A | 2/1998 |
| JP | 2005-043355 A | 2/2005 |
| JP | 2006-292532 A | 10/2006 |

OTHER PUBLICATIONS

Kenichi Kamiya, "Counterpart JP Patent Application No. P2010-160937 Office Action", Jan. 31, 2013, Publisher: JPO, Published in: JP.

* cited by examiner

*Primary Examiner* — Lewis West
(74) *Attorney, Agent, or Firm* — Kaplan Breyer Schwarz & Ottesen, LLP

(57) ABSTRACT

A method and apparatus for estimating whether or not a wireless terminal is indoors are disclosed. The illustrative embodiment employs a pattern classifier that is trained on a plurality of input/output mappings, where each mapping corresponds to a respective location, the output of the mapping is a Boolean value that indicates whether the location is indoors, and the input of the mapping is based on empirical and predicted signal data for the location. In accordance with the illustrative embodiment, a computer-executable program is generated based on the trained pattern classifier. The computer-executable program estimates whether or not a wireless terminal is indoors based on empirical data reported by the terminal, and on a location estimate for the terminal that might be crude or inaccurate (e.g., based on Cell Identifier [Cell-ID], GPS, etc.).

7 Claims, 9 Drawing Sheets

Figure 3

Table 300

| Lat | Lon | Empirical Data | | | Predicted Data | | |
|---|---|---|---|---|---|---|---|
| | | No. of Visible Base Stations | Signal-Strength Measurements | Interference Measurements | Signal Strengths | No. of Visible Base Stations | Indoors |
| ... | ... | ... | ... | ... | ... | ... | ... |

301 — Lat
302 — Lon
303 — No. of Visible Base Stations
304 — Signal-Strength Measurements
305 — Interference Measurements
306 — Signal Strengths
307 — No. of Visible Base Stations
308 — Indoors
220

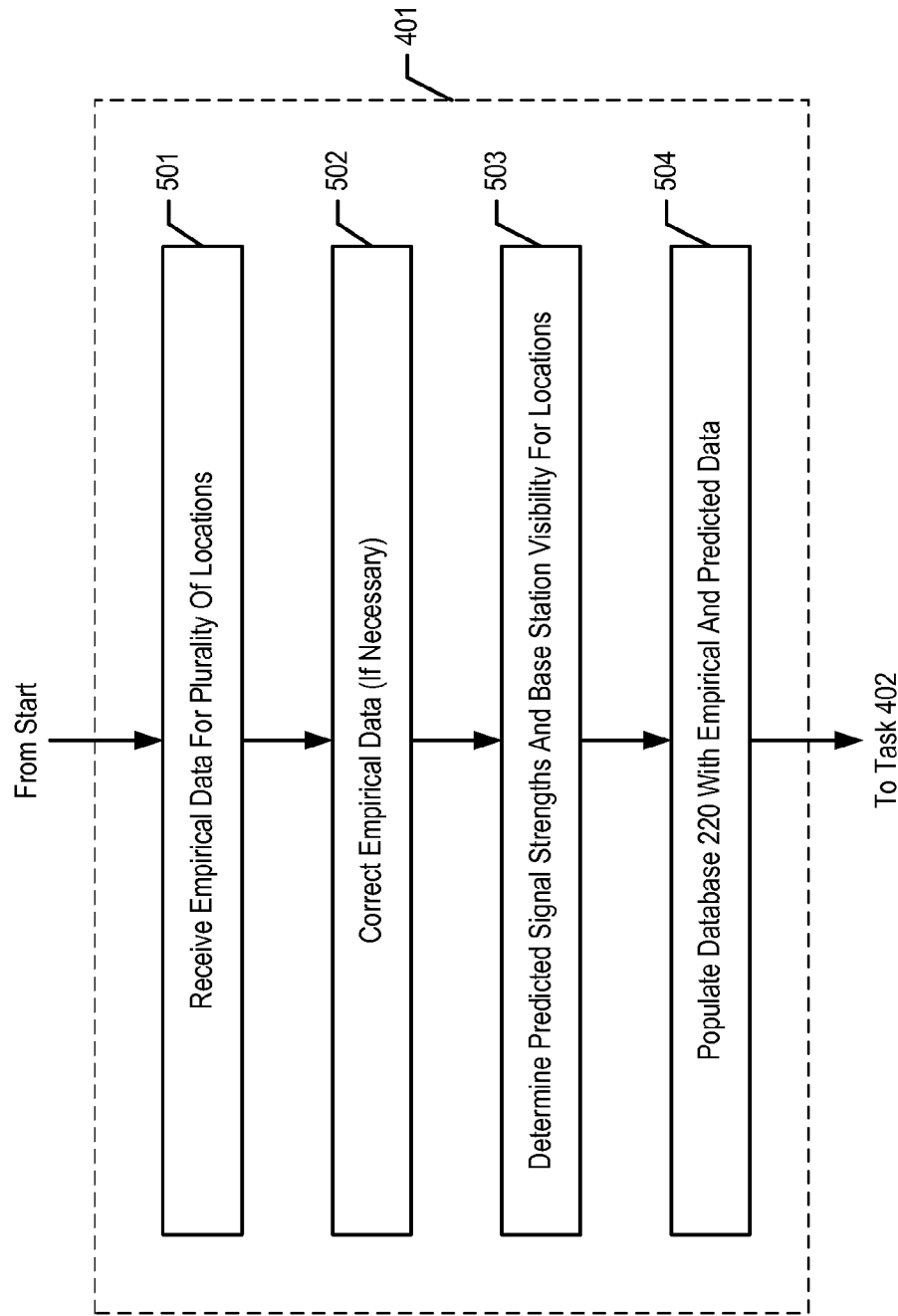

ESTIMATING WHETHER A WIRELESS TERMINAL IS INDOORS USING PATTERN CLASSIFICATION

FIELD OF THE INVENTION

The present invention relates to wireless telecommunications in general, and, more particularly, to methods and systems for estimating whether a wireless terminal is indoors.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1, 102-2, and 102-3, and wireless switching center 111, interconnected as shown. Wireless telecommunications system 100 provides wireless telecommunications service to all of geographic region 120, in well-known fashion.

The salient advantage of wireless telecommunications over wireline telecommunications is the mobility that is afforded to the users of the wireless telecommunications system. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her own location. For example, the user might be interested in telling a remote party where he or she is.

There are a variety of reasons why a remote party might be interested in knowing the location of the user. For example, the recipient of a 911 emergency call from a wireless terminal might be interested in knowing the location of the wireless terminal so that emergency services vehicles can be dispatched to that location.

A variety of techniques are known in the prior art for estimating the location of a wireless terminal.

In accordance with one technique, the location of a wireless terminal is estimated to be at the center of the cell in which the wireless terminal is located. This technique is advantageous in that it does not require that additional hardware be added to the wireless terminal or to the wireless telecommunications system, and this means that the first technique can be inexpensively implemented in legacy systems. The first technique is only accurate, however, to a few kilometers, and, therefore, it is generally not acceptable for applications (e.g., emergency services dispatch, etc.) that require higher accuracy.

In accordance with a second technique, the location of a wireless terminal is estimated by triangulating the angle of arrival or the time of arrival of the signals transmitted by the wireless terminal to be located at various receivers. This technique is accurate to within a few hundreds of meters and is advantageous in that it can be used with legacy wireless terminals. It is disadvantageous, however, in that it generally requires that hardware be added to the telecommunication system's base stations, and this is very expensive.

In accordance with a third technique, the location of a wireless terminal is estimated by a radio navigation unit, such as a Global Positioning System (GPS) receiver, that is incorporated into the wireless terminal. This technique is accurate to within tens of meters and is advantageous in that it does not require that additional hardware be added to the telecommunication system's infrastructure. Two disadvantages of GPS, however, is that it cannot be used with legacy wireless terminals that do not comprise a radio navigation unit, and it often fails to work indoors.

In some instances it might be desirable to know whether a wireless terminal is located indoors. In some such instances, such as when emergency parties are dispatched to a distressed caller, it might be desirable to have this information in addition to an estimate of the location of the wireless terminal—particularly when the estimate is imprecise—while in some other instances this information might be sufficiently useful without a location estimate.

Naturally if there is a mechanism for obtaining an accurate estimate of the location of a wireless terminal (e.g., Global Positioning System [GPS], etc.) and the geographical boundaries of buildings are known, then it is a straightforward matter to determine whether the wireless terminal is indoors or outdoors. However, information about the locations of buildings might not always be available. Moreover, a wireless terminal might lack the hardware or software required for obtaining an accurate location estimate. Finally, even when a wireless terminal does in fact have the requisite hardware and software, location estimation techniques such as GPS and triangulation can work poorly when the wireless terminal is indoors, due to signal penetration loss.

What is needed, therefore, is a technique for estimating whether a wireless terminal is indoors that is capable of overcoming these difficulties.

SUMMARY OF THE INVENTION

The present invention provides a technique for estimating whether or not a wireless terminal is indoors. In particular, the illustrative embodiment employs a pattern classifier (e.g., a neural network, a decision tree, a support vector machine [SVM], etc.) that is trained via a learning algorithm on a plurality of input/output mappings. In accordance with the illustrative embodiment, each mapping corresponds to a respective location, where the output of the mapping is a Boolean value that indicates whether the location is indoors, and the input of the mapping is based on the following empirical data for the location:
  the number of base stations whose transmissions are identified at the location (i.e., the number of base stations "visible" at the location),
  one or more signal-strength measurements of one or more base-station-transmitted signals at the location, and
  one or more interference measurements of one or more base-station-transmitted signals at the location,
and on the following predicted (i.e., theoretical) data for the location:
  the predicted number of base stations whose transmissions are identifiable at the location (i.e., the predicted number of "visible" base stations at the location), and
  one or more predicted signal strengths of one or more base-station-transmitted signals at the location.

During training, the pattern classifier learns to distinguish between the locations of the training set that are indoors and those that are outdoors. When the training procedure is effective, the pattern classifier also learns to predict, with relatively high accuracy, whether other locations not in the training set are indoors or outdoors. This prediction capability, known as generalization, is a result of the pattern classifier inferring rules and identifying patterns during training.

In accordance with the illustrative embodiment, after the pattern classifier has been trained, a computer-executable program is generated based on the trained pattern classifier.

At run-time the computer-executable program receives empirical data reported by a wireless terminal and a location estimate for the terminal that might be crude or inaccurate (e.g., based on Cell Identifier [Cell-ID], based on the Global Positioning System [GPS], etc.), and estimates whether or not the terminal is indoors based on this information.

The illustrative embodiment comprises: estimating whether or not a wireless terminal is indoors based, at least in part, on: (i) the number of base stations whose transmissions are identified at the wireless terminal, (ii) one or more signal-strength measurements of one or more base-station-transmitted signals at the wireless terminal, (iii) the predicted number of base stations whose transmissions are identifiable at the wireless terminal, and (iv) one or more predicted signal strengths of one or more base-station-transmitted signals at the wireless terminal.

BRIEF DESCRIPTION OF THE DRAWINGS

FIG. 3 depicts the contents of database 220, as shown in FIG. 2, in accordance with the illustrative embodiment of the present invention.

FIG. 5 depicts a detailed flowchart of task 401, as shown in FIG. 4, in accordance with the illustrative embodiment of the present invention.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume.

Figure 1:
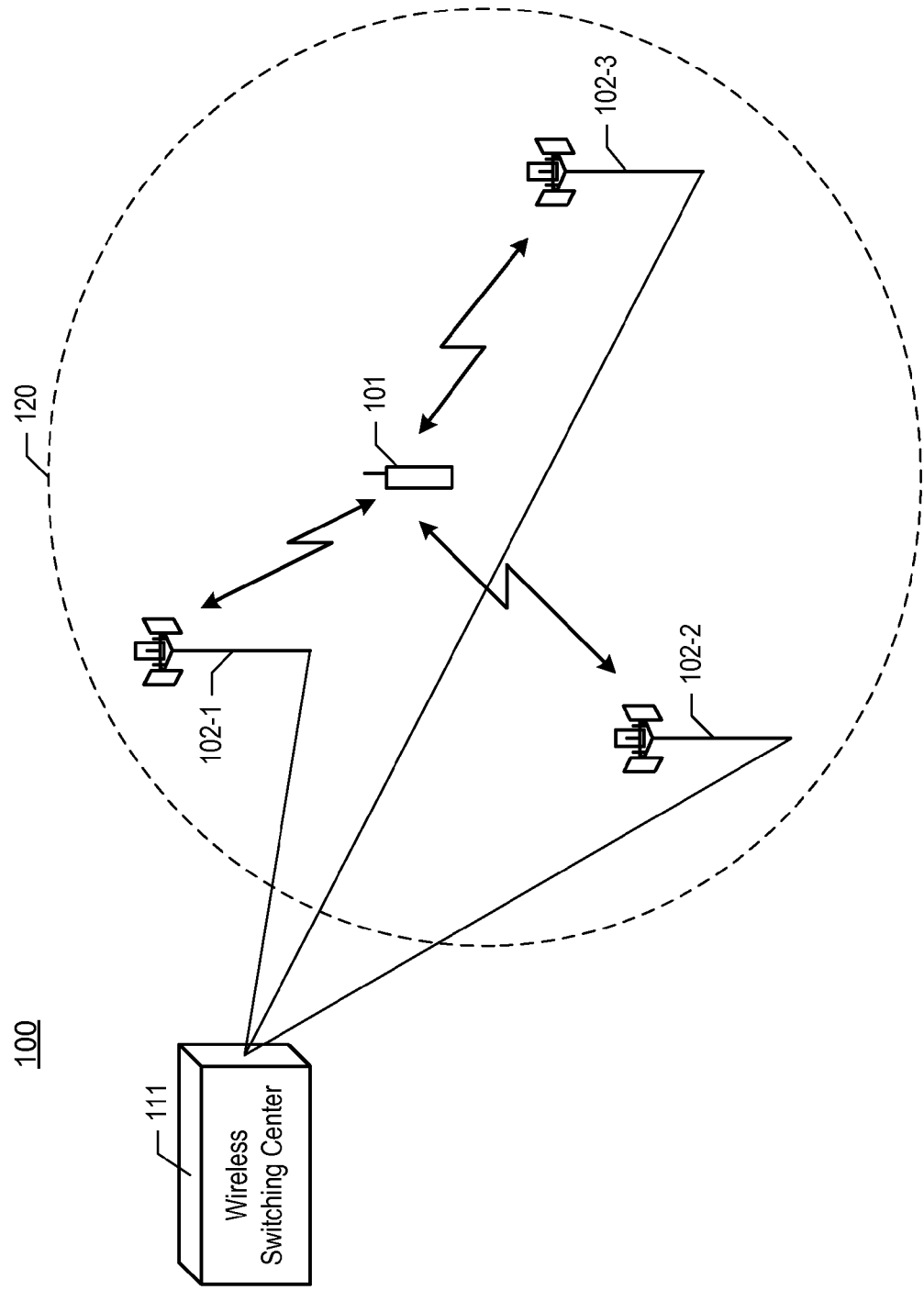
FIG. 1 depicts a diagram of the salient components of wireless telecommunications system 100 in accordance with the prior art.
Figure 2:
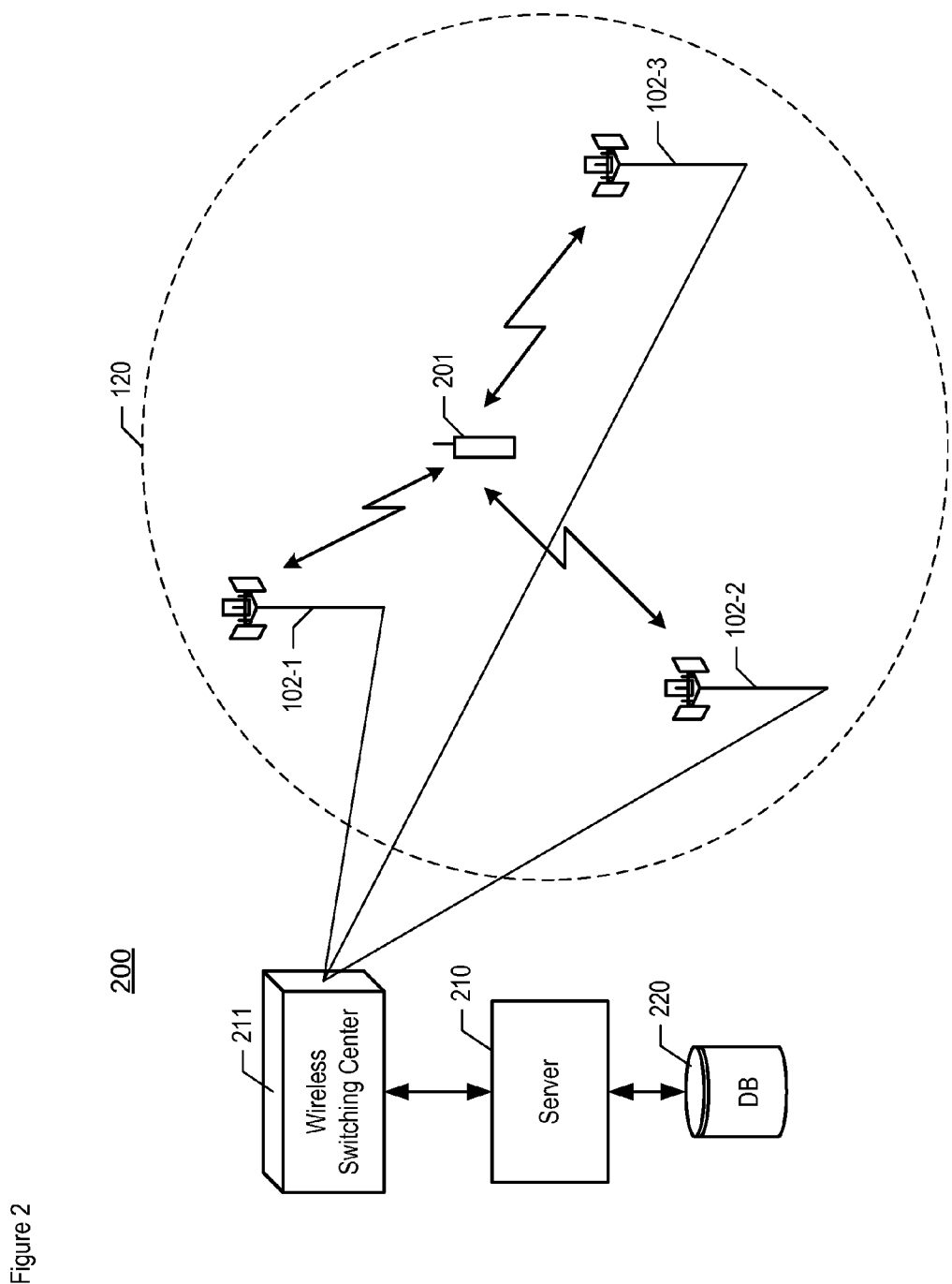
FIG. 2 depicts a schematic diagram of the salient components of wireless telecommunications system 200 in accordance with the illustrative embodiment of the present invention.

FIG. 2 depicts a schematic diagram of the salient components of wireless telecommunications system 200 in accordance with the illustrative embodiment of the present invention. As shown in FIG. 2, wireless telecommunications system 200 comprises wireless terminal 201, base stations 202-1, 202-2, and 202-3, wireless switching center 211, server 210, and database 220, interrelated as shown. The illustrative embodiment provides wireless telecommunications service to all of geographic region 120, in well-known fashion, and estimates whether or not wireless terminal 201 is indoors. In accordance with the illustrative embodiment, geographic region 120 might contain any number of buildings (not depicted in FIG. 2), including zero.

In accordance with the illustrative embodiment, wireless telecommunications service is provided to wireless terminal 201 in accordance with the Universal Mobile Telecommunications System, which is commonly known as "UMTS." After reading this disclosure, however, it will be clear to those skilled in the art how to make and use alternative embodiments of the present invention that operate in accordance with one or more other air-interface standards (e.g., Global System Mobile "GSM," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be UMTS-compliant and to perform the tasks described below and in the accompanying figures. Wireless terminal 201 is mobile and can be at any indoors or outdoors location within geographic region 120. Although wireless telecommunications system 200 comprises only one wireless terminal, it will be clear to those skilled in the art, after reading this disclosure, how to make and use alternative embodiments of the present invention that comprise any number of wireless terminals.

Base stations 202-1, 202-2, and 202-3 communicate with wireless switching center 211 and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, base stations 202-1, 202-2, and 202-3 are terrestrial, immobile, and within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Wireless switching center 211 comprises a switch that orchestrates the provisioning of telecommunications service to wireless terminal 201 and the flow of information to and from server 210, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

In accordance with the illustrative embodiment, wireless switching center 211 is outside of geographic region 120. It will be clear to those skilled in the art, after reading this disclosure, how to make and use alternative embodiments of the present invention in which some or all of wireless switching center 211 is instead within geographic region 120.

Server 210 is a data-processing system that is capable of:
- writing to and reading from database 220;
- training a pattern classifier based on the contents of database 220;
- generating a computer-executable program that simulates the trained pattern classifier;
- executing the generated computer-executable program;
- communicating with wireless switching center 211; and
- receiving an estimate of the location of a wireless terminal from another entity (e.g., a location sever not depicted in FIG. 2, etc.), or generating the location estimate itself, or both;

as described below and with respect to FIGS. 4 through 7.

Database 220 stores measured and predicted signal traits for a plurality of locations in geographic region 120, as described in detail below and with respect to FIG. 3. In accordance with the illustrative embodiment, database 220 is a relational database; as will be appreciated by those skilled in the art, in some other embodiments of the present invention, database 220 might be another type of database (e.g., an object-oriented database, a hierarchical database, etc.), or might be another type of data store that does not necessarily support the type of query processing typically offered by databases (e.g., an unstructured file, a simple contiguous block of random-access memory, etc.).

FIG. 3 depicts the contents of database 220 in accordance with the illustrative embodiment of the present invention. As shown in FIG. 3, database 220 contains table 300 comprising eight columns 301 through 308. In accordance with the illustrative embodiment, each row of table 300 corresponds to a respective location in geographic region 120.

Column 301 stores the latitude of each location in geographic region 120.

Column 302 stores the longitude of each location in geographic region 120.

Column 303 stores the number of base stations whose transmissions are identified at each location in geographic region 120, as determined empirically (e.g., as reported by a wireless terminal, as reported during a drive test through geographic region 120, etc.). In other words, the values of column 303 indicate how many base stations are empirically "visible" at each location. As will be appreciated by those skilled in the art, in some embodiments of the present invention the contents of column 303 might also indicate, in addition to the number of visible base stations at the location, how many of these visible base stations actively communicate with a wireless terminal at that location.

Column 304 stores signal-strength measurements of base-station-transmitted signals at each location in geographic region 120, as determined empirically.

Column 305 stores interference measurements of base-station-transmitted signals at each location in geographic region 120, as determined empirically.

Column 306 stores predicted signal strengths of base-station-transmitted signals at each location in geographic region 120. In accordance with the illustrative embodiment, the predicted signal strengths are obtained from a pre-computed propagation map that models all locations as outdoors locations. As will be appreciated by those skilled in the art, in some other embodiments of the present invention the predicted signal strengths might be determined in some other manner (e.g., via a mathematical model, from a different type of propagation map, etc.).

Column 307 stores the predicted number of base stations whose transmissions are identifiable (i.e., the predicted number of "visible" base stations) at each location in geographic region 120. As will be appreciated by those skilled in the art, the predicted number of visible base stations might be determined in a variety of ways, such as via ray tracing, propagation analysis, mathematical modeling, etc.

Column 308 stores a value that indicates whether each location is indoors or outdoors. As will be appreciated by those skilled in the art, in some embodiments of the present invention the values of column 308 might be Boolean, while in some other embodiments column 308 might store a non-Boolean value, such as a real number in [0,1] corresponding to a probability or confidence metric, instead of, or perhaps in addition to, a Boolean value.

As will be appreciated by those skilled in the art, in some other embodiments of the present invention, database 220 might represent information in a different manner (e.g., location might be represented by Cartesian coordinates, etc.), or might omit one or more empirical data of the illustrative embodiment, or might omit one or more predicted data of the illustrative embodiment, or might store other empirical data in addition to those of the illustrative embodiment, or might store other predicted data in addition to those of the illustrative embodiment, and it will be clear to those skilled in the art, after reading this disclosure, how to make and use such alternative embodiments of database 220. As will further be appreciated by those skilled in the art, in some other embodiments of the present invention, database 220 might employ an alternative schema for storing and organizing information, and it will be clear to those skilled in the art, after reading this disclosure, how to make and use such alternative embodiments of database 220.

Figure 4:
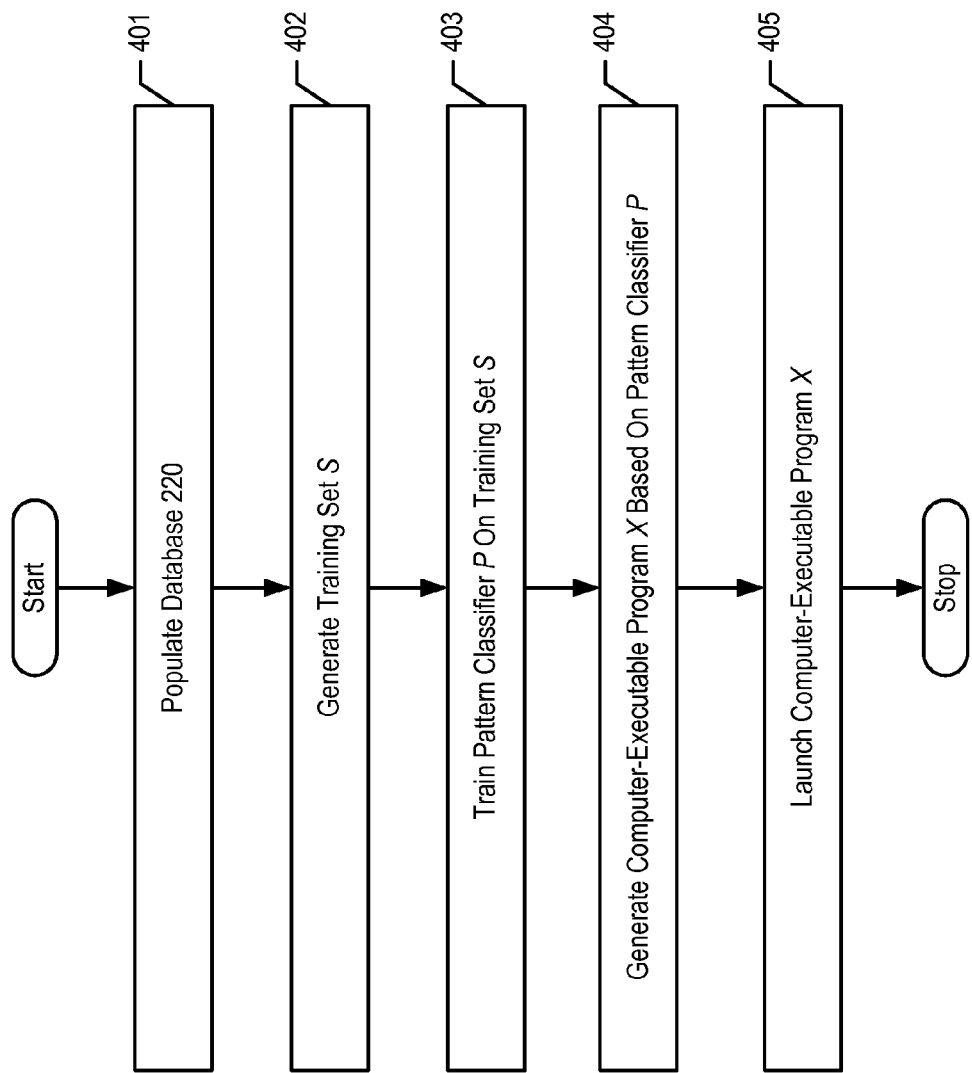
FIG. 4 depicts a flowchart of the salient tasks of the illustrative embodiment of the present invention.

FIG. 4 depicts a flowchart of the salient tasks of the illustrative embodiment of the present invention. It will be clear to those skilled in the art, after reading this disclosure, which tasks depicted in FIG. 4 can be performed simultaneously or in a different order than that depicted.

In accordance with the illustrative embodiment, the tasks of the method of FIG. 4 are performed by server 210; however, as will be appreciated by those skilled in the art, in some other embodiments of the present invention one or more of the tasks of FIG. 4 might be performed by another entity (e.g., wireless switching center 211, a data-processing system not depicted in FIG. 2, etc.), and it will be clear to those skilled in the art, after reading this disclosure, how to make and use such alternative embodiments.

At task 401, server 210 populates database 220; task 401 is described in detail below and with respect to FIG. 5.

At task 402, server 210 generates a training set S of input/output mappings based on the contents of database 220, where the input of each mapping is a vector based on:
  (i) the values of columns 303 through 307 in some row of table 300, and optionally,
  (ii) the values of columns 306 and 307 in one or more additional rows of table 300,
and where the output of each mapping is based on the value of column 308 in the row of item (i) above. In accordance with the illustrative embodiment, the optional rows of item (ii) are rows whose locations are within a particular distance of item (i)'s location—thereby capturing the fact that an imprecise location estimate is typically a circle centered at a particular point, where the radius of the circle reflects the magnitude of the imprecision (e.g., error bounds, confidence bounds, etc.).

In accordance with the illustrative embodiment, the input vector comprises the following elements:

the number of base stations whose transmissions are identified (i.e., the empirical number of visible base stations), as indicated in column 303 of the selected row;

one or more values based on the signal-strength measurement(s) in column 304 of the selected row (e.g., the mean, the variance, a higher-order statistical moment, the difference between maximum and minimum, some or all of the individual measurements, etc.);

one or more values based on the interference measurement(s) in column 305 of the selected row (e.g., the mean, the variance, a higher-order statistical moment, the difference between maximum and minimum, some or all of the individual measurements, etc.);

one or more values based on the predicted signal strength(s) in column 306 of the selected (and optionally, additional) row(s) (e.g., the mean, the variance, a higher-order statistical moment, the difference between maximum and minimum, some or all of the individual signal strengths, etc.);

the predicted number of base stations whose transmissions are identifiable (i.e., the predicted number of visible base stations), as indicated in column 307 of the selected (and optionally, additional) row(s); and one or more values based on both the signal-strength measurement(s) of column 304 and the predicted signal strength(s) of column 306 (e.g., a statistical measure of the differences between measured and predicted signal strengths, a correlation coefficient, etc.).

As will be appreciated by those skilled in the art, the elements of the input vector might be represented in a variety of ways (e.g., normalized values, raw values, quantized values, etc.). As will further be appreciated by those skilled in the art, in some other embodiments of the present invention one or more of the input elements of the illustrative embodiment might be omitted, or one or more different input elements might be employed in addition to those of the illustrative embodiments (e.g., timing information, percentage of indoor points at possible locations etc.), or both, and it will be clear to those skilled in the art, after reading this disclosure, how to make and use such alternative embodiments. As will yet further be appreciated by those skilled in the art, some other embodiments of the present invention might model location estimation errors in an alternative manner (e.g., use an area other than a circle, etc.), or might not use location estimation errors at all (i.e., by omitting the additional rows of item (ii) above), and it will be clear to those skilled in the art, after reading this disclosure, how to make and use such alternative embodiments. Moreover, it is well-known in the art that the extraction of a training set from a collection of data, as well as determining which inputs to feed into a pattern classifier and an appropriate data representation scheme, are an art in itself and critical for effective training.

At task 403, server 210 trains a pattern classifier P on training set S in accordance with an appropriate learning algorithm, in well-known fashion. In accordance with the illustrative embodiment of the present invention, pattern classifier P is a type of pattern classifier known in the art as a support vector machine (SVM). As will be appreciated by those skilled in the art, a variety of other types of pattern classifiers might be used instead (e.g., a neural network, a decision tree, a genetic algorithm, etc.), and it is well-known in the art how to train such pattern classifiers.

At task 404, server 210 generates a computer-executable program X that: accepts a set of inputs, generates an input vector based on the set of inputs, simulates the execution of trained pattern classifier P on the input vector, and outputs the output value generated by pattern classifier P. It is well known in the art how to generate such a computer-executable program based on a given pattern classifier.

At task 405, computer-executable program X is launched at server 210. As noted above, in some other embodiments of the present invention, computer-executable program X might be deployed and launched at some other entity (e.g., wireless switching center 211, a data-processing system not depicted in FIG. 2, a wireless terminal, etc.), and it will be clear to those skilled in the art, after reading this disclosure, how to make and use such alternative embodiments. After task 405, the method of FIG. 4 terminates.

FIG. 5 depicts a detailed flowchart of task 401 in accordance with the illustrative embodiment of the present invention. It will be clear to those skilled in the art, after reading this disclosure, which subtasks depicted in FIG. 5 can be performed simultaneously or in a different order than that depicted.

At subtask 501, server 210 receives empirical data for a plurality of locations including, for each location: the number of base stations from which transmissions are identified (i.e., the number of visible base stations at each location, as determined empirically); signal-strength measurements of base-station-transmitted signals at each location; interference measurements of base-station-transmitted signals at each location; and optionally, the number of visible base stations that a wireless terminal actively communicates with at each location.

As will be appreciated by those skilled in the art, these measurements often have errors, some of which might be due to predictable factors, and some of which might be due to unpredictable factors. When the nature or magnitude of the measurement errors is unpredictable, there is little that can be done to compensate for them. However, measurement errors that are predictable can be corrected, and it is well-known in the art that the nature and magnitude of some measurement errors are in fact predictable. For example, the radio used to obtain the measurements might be known to incorrectly measure and report the strength of signals by a fixed amount (say, −2 dB). Consequently, it is advantageous, if possible, to correct such systemic errors prior to training pattern classifier P on the measurements. A technique for doing so based on distortion functions is now described below and with respect to FIGS. 6a through 6c.

The distortion function D(A,K,Q) for a particular radio relates the reported measurement R for a trait Q (e.g., signal strength, to the actual value A for that trait and the defining characteristic K of the radio making the measurement:

$$R = D(A, K, Q). \quad \text{(Eq. 1)}$$

In accordance with the illustrative embodiment, the distortion function D(A,K,Q) for the radio that measures and reports the signal trait values is provided by the radio manufacturer. It will be clear to those skilled in the art, however, after reading this disclosure, how to generate the distortion function D(A, K,Q) for any radio without the assistance of the radio manufacturer.

Figure 6A:
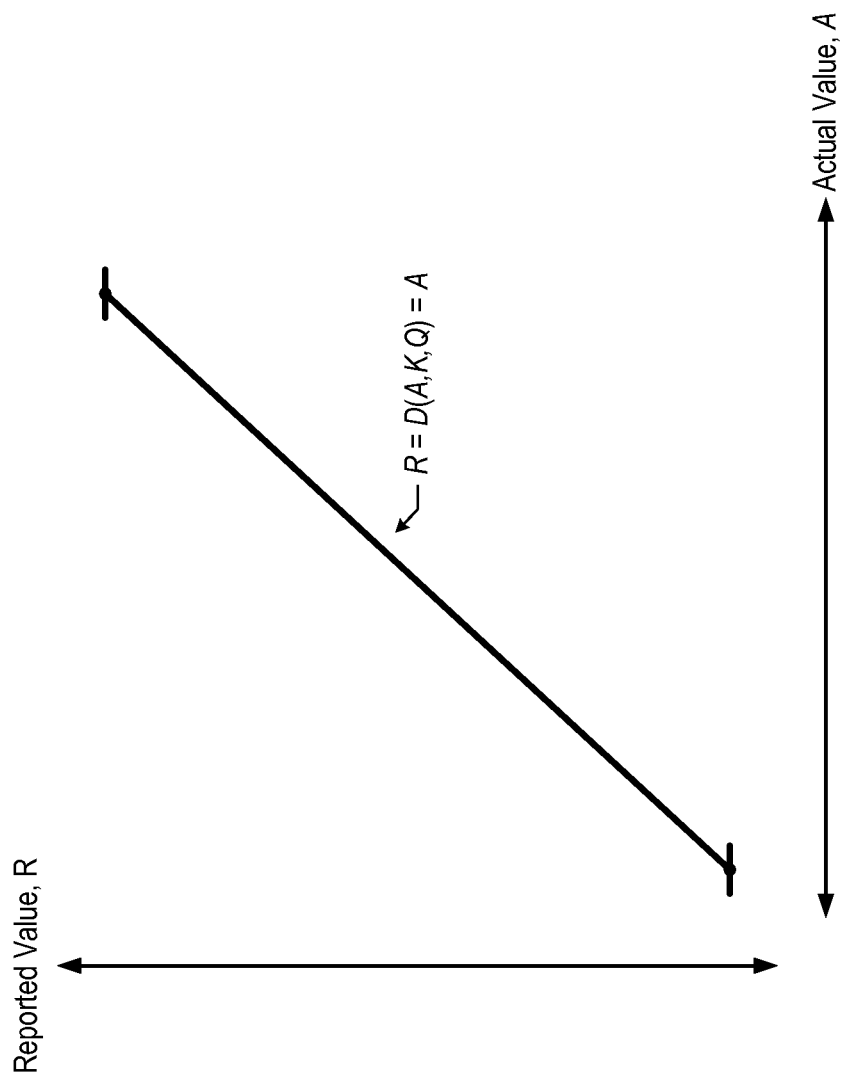
FIG. 6a depicts the distortion function D(A,K,Q) for one trait and for an ideal radio.

An ideal radio perfectly measures and reports the value of the traits it receives; the distortion function D(A,K,Q) for one trait and for an ideal radio is depicted in FIG. 6a. As is apparent from the graph in FIG. 6a, the salient characteristic of an ideal radio is that the reported value of the measurement, R, is exactly equal to the actual value of the trait A at the radio's location (i.e., there is no measurement or reporting error).

Figure 6B:
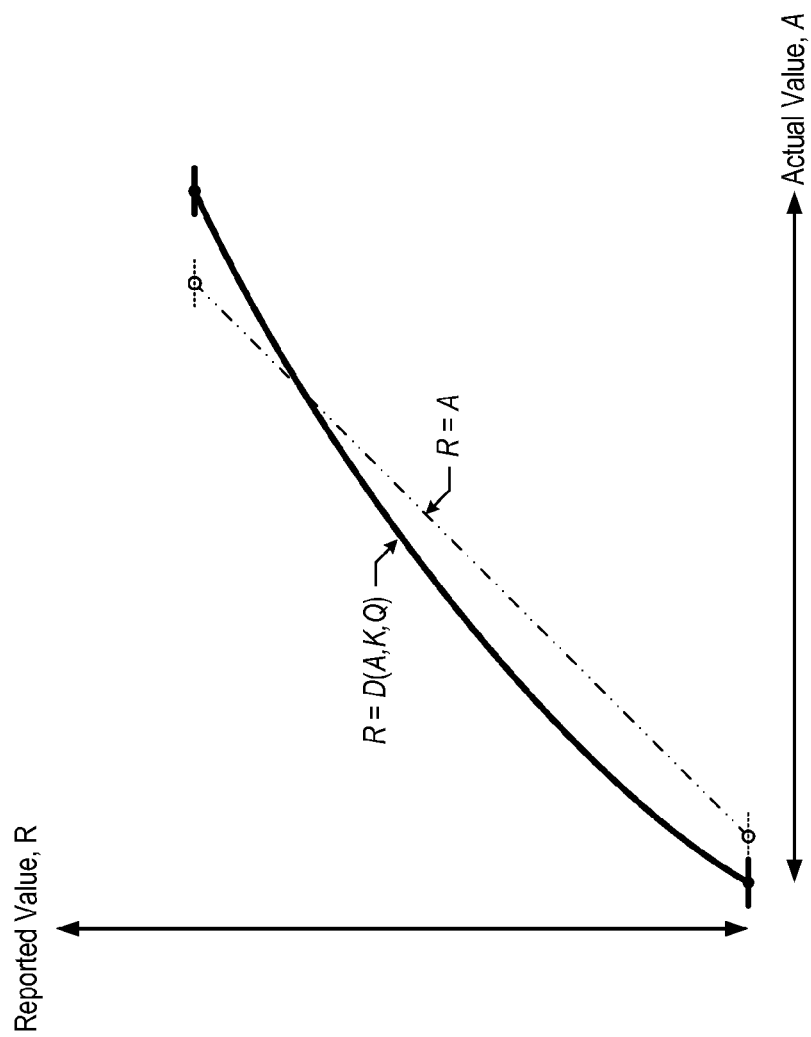
FIG. 6b depicts a graph of the distortion function of an illustrative real-world radio.

A real-world radio, in contrast, typically does not perfectly measure the traits of the signals they receive. This is particularly true for measurements of signal strength where the errors can be large. For example, FIG. 6b depicts a graph of the distortion function of an illustrative real-world radio. In this case, the reported measurement is too high for some values, too low for others, and correct for only one value.

The nature and magnitude of each of the errors in the reported measurements is inherent in the distortion function D(A,K,Q), and, therefore, knowing the distortion function, a calibration function, denoted C(R,K,Q), can be derived from the distortion function. Once obtained, the calibration function can be applied to the measurements to eliminate the distortion errors and thereby recover the actual values of the traits.

In general, the calibration function C(R,K,Q) relates the calibrated measurement of a trait Q to the reported measurement R of trait Q and the defining characteristic K of the radio making the measurement:

$$R'=D(R,K,Q) \qquad (Eq.\ 2)$$

where R' denotes the calibrated value of measurement R.

The calibration function C(R,K,Q) is the inverse of the distortion function D(A,K,Q). In other words, the salient characteristic of the calibration function C(R,K,Q) is that it satisfies the equation:

$$R'=A=C(D(A,K,Q),K,Q) \qquad (Eq.\ 3)$$

so that the calibrated measurement, R', is what the reported measurement, R, would have been had the radio making and reporting the measurement been ideal.

Figure 6C:
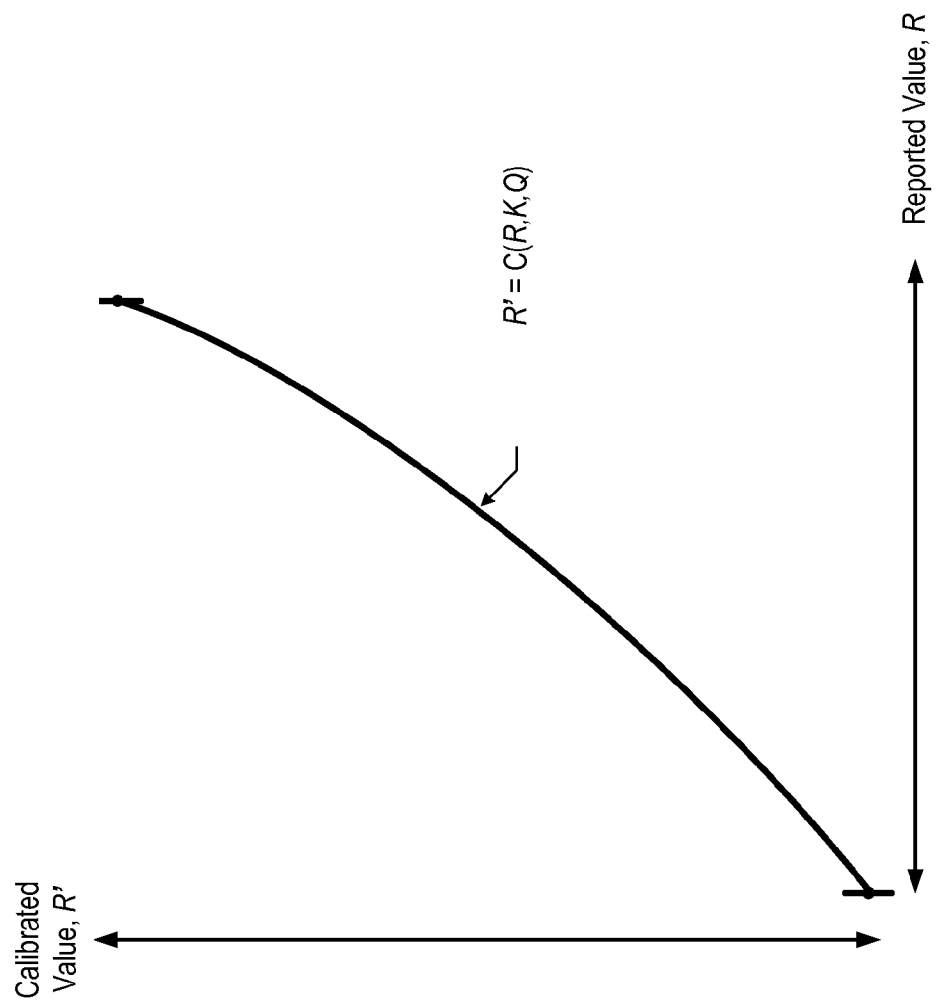
FIG. 6c depicts a graph of the calibration function C(R,K,Q) for the distortion function D(A,K,Q) depicted in FIG. 6b.

FIG. 6c depicts a graph of the calibration function C(R,K,Q) for the distortion function D(A,K,Q) depicted in FIG. 6b. It will be clear to those skilled in the art, after reading this disclosure, how to derive C(R,K,Q) from D(A,K,Q).

At subtask 502, server 210 corrects the measurements received at subtask 501, if necessary, based on the radio that obtained the measurements, as described above.

At subtask 503, server 210 determines predicted (i.e., theoretical) signal strengths and base station visibility for the plurality of locations. In accordance with the illustrative embodiment, the predicted signal strengths are obtained from a pre-computed propagation map that models all locations as outdoors locations. As will be appreciated by those skilled in the art, in some other embodiments of the present invention the predicted signal strengths might be determined in some other manner (e.g., via a mathematical model, from a different type of propagation map, etc.). Similarly, as will be appreciated by those skilled in the art, predicted base station visibility (i.e., the predicted number of base stations whose transmissions are identifiable at a location) might also be determined in a variety of ways, such as via ray tracing, propagation analysis, mathematical modeling, etc. As will further be appreciated by those skilled in the art, in some embodiments of the present invention the empirical data obtained at subtask 501 might be utilized for refining the predictive estimates at subtask 503, as well as for training the pattern classifier at task 403.

At subtask 504, server 210 populates table 300 of database 220 with the (possibly corrected) empirical data obtained at subtasks 501 and 502 and the predicted data obtained at subtask 503, in well-known fashion. After subtask 504, task 401 is completed and execution proceeds to task 402.

Figure 7:
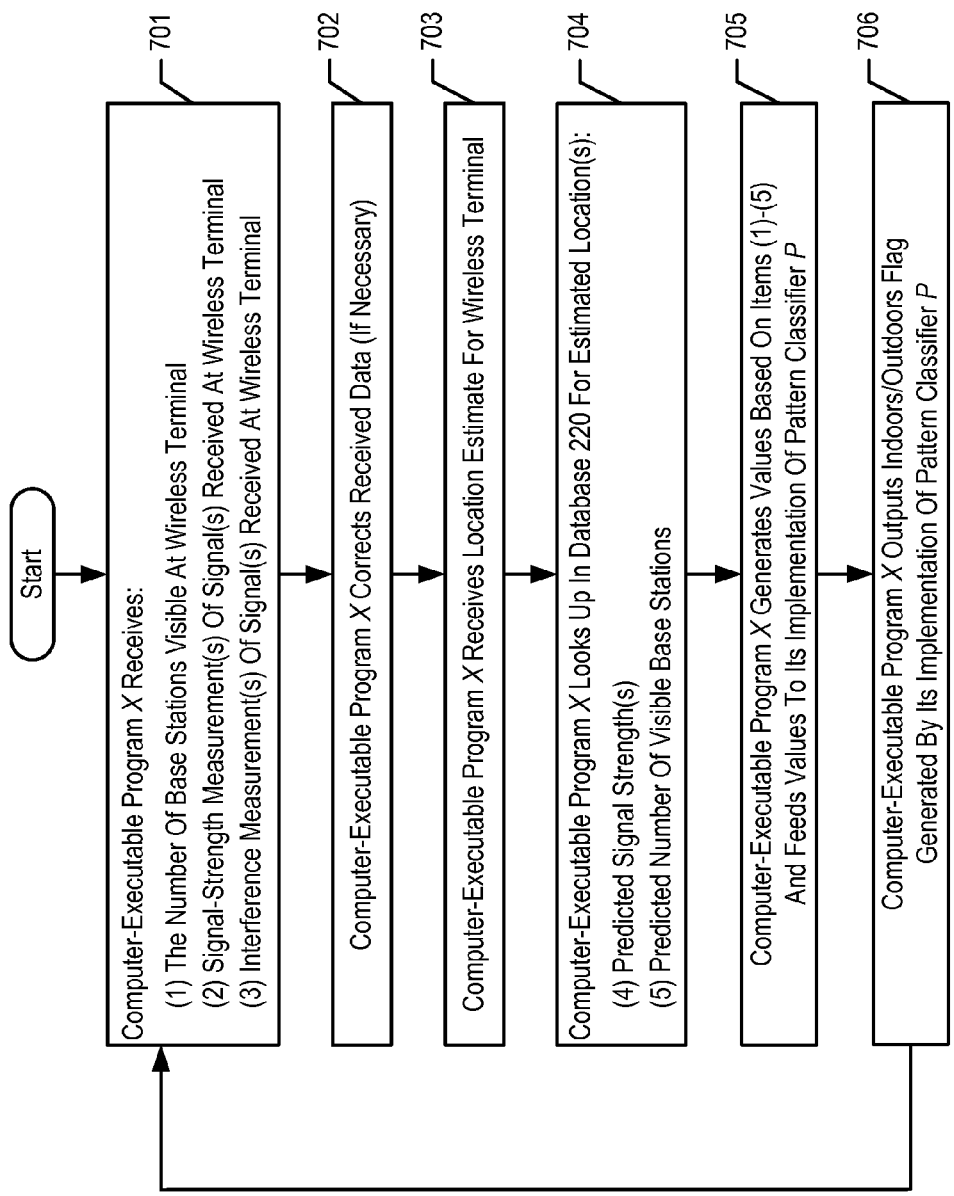
FIG. 7 depicts a flowchart of the execution of the computer-executable program generated at task 404, as shown in FIG. 4, in accordance with the illustrative embodiment of the present invention.

FIG. 7 depicts a flowchart of the execution of computer-executable program X generated at task 404, in accordance with the illustrative embodiment of the present invention.

At task 701, computer-executable program X receives:
- (item 1) the number of base stations whose transmissions are identified at a wireless terminal in geographic region 120 (e.g., wireless terminal 201, etc.), and optionally, how many of those base stations the wireless terminal is actively communicating with;
- (item 2) signal-strength measurement(s) of base-station-transmitted signal(s) at the wireless terminal; and
- (item 3) interference measurement(s) of base-station-transmitted signal(s) at the wireless terminal.

As will be appreciated by those skilled in the art, in some embodiments of the present invention server 210 might receive these data from the wireless terminal via wireless switching center 211, while in some other embodiments, server 210 might receive some or all of these data might be received from another entity (e.g., a data-processing system not depicted in FIG. 2, etc.), or directly from the wireless terminal itself (e.g., via a data connection, etc.). In any case, it will be clear to those skilled in the art, after reading this disclosure, how to make and use embodiments of the present invention that perform task 701.

At task 702, computer-executable program X corrects, if necessary, one or more of the data received at task 701.

In accordance with the illustrative embodiment, a calibration table is employed that stores the values of a plurality of calibration functions C(R,K,Q) for various combinations of reported measurement R, characteristic K and trait Q. For example, for the case in which items (1) through (3) are measured and reported by the wireless terminal, a calibration table such as the one shown below in Table 1 might be employed.

TABLE 1

Illustrative Calibration Function Table

R' = C(R, C, N)

| R | C = Motorola Model A008; Q = Signal Strength | ... | C = Samsung Model A800; Q = Signal Strength |
|---|---|---|---|
| −110 | −115 | ... | −107 |
| −109 | −114 | ... | −106 |
| ... | ... | ... | ... |
| −48 | −38 | ... | −50 |
| −47 | −37 | ... | −49 |

The purpose of the characteristic, K, is to identify which calibration function should be used in calibrating the reported measurements from the wireless terminal, and, therefore, the characteristic, K, should be as indicative of the actual calibration function for the wireless terminal as is economically reasonable.

For example, the characteristic, K, can be, but is not limited to:
i. the unique identity of the wireless terminal (e.g., its electronic serial number ("ESN"), its international mobile station identifier ("IMSI"), its temporary international mobile station identifier ("TIMSI"), mobile station identification ("MSID"), its directory number ("DN"), etc.); or
ii. the model of the wireless terminal (e.g., Timeport 26c, etc.); or iii. the make (i.e., manufacturer) of the wireless terminal (e.g., Motorola, Samsung, Nokia, etc.); or
iv. the identity of the radio-frequency circuitry of wireless terminal 201 (e.g., Motorola RF circuit design 465LFRB, etc.); or
v. the identity of one or more components of the wireless terminal (e.g., the part number of the antenna, the part number of the measuring component, etc.); or
viii. any combination of i, ii, iii, iv, v, vi, and vii.

The most accurate characteristic is the unique identity of the particular wireless terminal, because the calibration function generated for that very wireless terminal could then be used to correct the measurement errors at the terminal. It is unlikely, however, that this is economically feasible, because it would require that every wireless terminal be tested to determine its own unique distortion function.

On the other hand, using only the make of the wireless terminal as the characteristic, K, is economically reasonable, but it is unlikely that a single calibration function for all of a manufacturer's wireless terminals would provide very accurate calibrated signal-strength measurements.

As a compromise, the illustrative embodiment uses the combination of make and model of the wireless terminal as the characteristic, K, because it is believed that the amount of variation between wireless terminals of the same make and model will be small enough that a single calibration function for that model should provide acceptably accurate calibrated measurements for every wireless terminal of that make and model.

As will be appreciated by those skilled in the art, some other embodiments of the present invention might employ characteristics K for calibration function C(R,K,Q) that differ from those of the illustrative embodiment, or might represent calibration function C(R,K,Q) in a manner other than tabular form, or might in fact do away with task 702 altogether (i.e., not even bother with correcting the reported measurements), and it will be clear to those skilled in the art, after reading this disclosure, how to make and use such embodiments.

At task 703, computer-executable program X receives a location estimate for the wireless terminal. As will be appreciated by those skilled in the art, the location estimate received at task 703 might be obtained via any one of a variety of possible techniques, such as via Cell Identifier (Cell-ID), GPS, radio frequency (RF) fingerprinting, triangulation, etc.; moreover, in some embodiments of the present invention, the location estimate might originate from the wireless terminal, while in some other embodiments, the location estimate might originate from another entity (e.g., wireless switching center 211, one or more base stations 102-$i$, a location server or other type of data-processing system not depicted in FIG. 2, etc.). As will further be appreciated by those skilled in the art, in some embodiments of the present invention the location estimate might be a single location, while in some other embodiments of the present invention the location estimate might comprise a plurality of locations (e.g., a circle comprising a plurality of locations, etc.). In any case, it will be clear to those skilled in the art, after reading this disclosure, how to make and use embodiments of the present invention that perform task 703.

At task 704, computer-executable program X looks up in table 300 of database 220 for each of the estimated location (s):
(item 4) predicted signal strength(s) for base-station-transmitted signal(s) at that location (i.e., the value(s) in column 306 for that location); and
(item 5) the predicted number of base stations visible at that location (i.e., the value in column 307 for that location).

At task 705, computer-executable program X generates values based on items (1) through (5), and feeds the values to its implementation of trained pattern classifier P. In accordance with the illustrative embodiment, the generated values comprise:
item (1);
one or more values based on the signal-strength measurement(s) of item (2) (e.g., the mean, the variance, a higher-order statistical moment, the difference between maximum and minimum, some or all of the individual measurements, etc.);
one or more values based on the interference measurement(s) of item (3) (e.g., the mean, the variance, a higher-order statistical moment, the difference between maximum and minimum, some or all of the individual measurements, etc.);
one or more values based on the predicted signal strength(s) of item (4) for all of the estimated location(s) (e.g., the mean, the variance, a higher-order statistical moment, the difference between maximum and minimum, some or all of the individual signal strengths, etc.);
one or more values based on the predicted number of visible base stations of item (5) for all of the estimated location(s) (e.g., the mean, the median, the mode, the variance, a higher-order statistical moment, the difference between maximum and minimum, etc.); and
one or more values based on both the signal-strength measurement(s) of item (2) and the predicted signal strength(s) of item (4) (e.g., a statistical measure of the differences between measured and predicted signal strengths, a correlation coefficient, etc.).

At task 706, computer-executable program X outputs the indoors/outdoors flag generated by its implementation of trained pattern classifier P. After task 706, execution of computer-executable program X continues back at task 701 for the next iteration.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising estimating whether or not a wireless terminal is indoors, wherein the estimation is based, at least in part, on:
   (i) the number of base stations whose transmissions are identified at said wireless terminal,
   (ii) one or more signal-strength measurements of one or more base-station-transmitted signals at said wireless terminal,
   (iii) the predicted number of base stations whose transmissions are identifiable at said wireless terminal, and
   (iv) one or more predicted signal strengths of one or more base-station-transmitted signals at said wireless terminal; and
   wherein the estimation of whether or not said wireless terminal is indoors results from a trained pattern classifier.

2. The method of claim 1 wherein said one or more predicted signal strengths are based on a propagation map that models all locations as outdoors.

3. The method of claim 1 wherein the estimation is based on a statistical moment of said one or more signal-strength measurements.

4. The method of claim 1 wherein the estimation is based on the difference between the maximum and the minimum of said one or more signal-strength measurements.

5. The method of claim 1 wherein the estimation is also based on one or more interference measurements of one or more base-station-transmitted signals at said wireless terminal.

6. The method of claim 5 wherein the estimation is based on a statistical moment of said one or more interference measurements.

7. The method of claim 1 wherein the estimation is also based on how many base stations said wireless terminal is actively communicating with.

* * * * *